United States Patent
Ekholm et al.

[11] Patent Number: 5,904,753
[45] Date of Patent: May 18, 1999

[54] SEPARATION DEVICE AND PROCESS

[75] Inventors: Rolf Ekholm; Ulf Jansson, both of Karlstad, Sweden

[73] Assignee: Kvaerner Pulping AB, Karlstad, Sweden

[21] Appl. No.: 09/060,374

[22] Filed: Apr. 15, 1998

Related U.S. Application Data

[62] Division of application No. 08/598,174, Feb. 7, 1996, which is a continuation of application No. 08/256,702, Jul. 21, 1994, abandoned.

[30] Foreign Application Priority Data

Jan. 23, 1992 [SE] Sweden .................................. 9200183

[51] Int. Cl.6 ............................ B01D 46/00; B01D 50/00
[52] U.S. Cl. ............................... 95/222; 95/226; 95/271; 96/321; 96/355
[58] Field of Search .......................... 95/216, 226, 219, 95/221, 222, 271; 96/262, 301, 314, 317, 318, 321, 366, 355; 261/114.2

[56] References Cited

U.S. PATENT DOCUMENTS

| | | | |
|---|---|---|---|
| 1,768,468 | 6/1930 | Madsen | 96/317 |
| 2,194,126 | 3/1940 | Schwandt | 261/114.2 |
| 2,226,127 | 12/1940 | Harmon | 96/262 |
| 2,238,824 | 4/1941 | Ryner | 96/262 |
| 3,225,522 | 12/1965 | Black | 96/301 |
| 3,331,194 | 7/1967 | Reed et al. | 96/321 |
| 5,158,714 | 10/1992 | Shih et al. | 261/114.2 |
| 5,346,588 | 9/1994 | Sixta et al. | 162/65 |
| 5,415,734 | 5/1995 | Backlund et al. | 162/40 |

*Primary Examiner*—C. Scott Bushey
*Attorney, Agent, or Firm*—W. Warren Taltavull; Farkas & Manelli PLLC

[57] ABSTRACT

The present invention relates to a process and a device for the separation and purification of gas from a fiber suspension, especially residual gas after ozone delignification or pulp suspension, wherein the suspension together with the gas is introduced into a cyclone (2) or similar in which essential separation of suspension takes place, after which the essentially gas-free suspension is drawn off downwards and the gas (5) containing residual fiber and/or other impurities is drawn off upwards, the gas stream (5), before it is conducted away, being led through a liquid bath for separation of residual fibers and/or other impurities from the gas stream.

8 Claims, 4 Drawing Sheets

A-A

SEPARATION DEVICE AND PROCESS

This application is a division of Ser. No. 08/598,174 filed Feb. 7,1996 which is a continuation of Ser. No. 08/256,702, filed Jul. 21, 1994, now abandoned.

FIELD

The following invention relates to a device and a process for the separation and purification of gas, especially a treatment gas, from a fibre suspension, especially residual gas after ozone delignification or pulp suspension, wherein the suspension together with the gas is introduced into a cyclone or similar device, in which an essential separation of the gas from the suspension takes place after which the essentially gas-free suspension is drawn off downwards and the gas containing residual fibre and/or other impurities is drawn off upwards.

PRIOR ART AND PROBLEMS

In the following the invention will be described by referring to a specific field, namely the pulp industry, where the problem which the invention is intended to solve is well-known, which is not, however, to be seen as having any limiting effect on the scope of the invention, which is defined by the subsequent patent claims. In the pulp industry the fibre suspension is often treated with gas, for example with the intention of bleaching the pulp. Subsequently it is desirable to separate the residues of the added treatment gas from the pulp before the latter is subjected to further treatment. Recently it has become much more common to use ozone in connection with bleaching the pulp. Ozone is produced using air or oxygen. After ozone bleaching the major part of the air or oxygen remains as a residual gas. This residual gas also contains small quantities of ozone. The residual ozone remaining after the treatment of the pulp cannot, for environmental reasons, be released directly into the atmosphere but must first be neutralised, which most frequently is achieved in a so-called "ozone destroyer".

However, in order that it should function properly an "ozone destroyer" requires a very high degree of purity in the gas that is to be treated. This implies that the gas which is separated from the pulp suspension must be purified from residual fibres and any other impurities, such as sulphur dioxide ($SO_2$), sulphuric acid ($H_2SO_4$), etc., before it is introduced into an "ozone destroyer".

One purpose of the invention is thus to present a process and a device for the separation of residual fibre, etc., from an above-mentioned gas stream.

A further purpose of the present invention is to present a process and a device for the separation of gas from a fibre suspension comprising a cleaning device which requires relatively little maintenance and which preferably can be run continuously.

DESCRIPTION OF THE FIGURES

In the following the invention will be explained in more detail with the aid of the enclosed drawings, in which:

FIG. 1 thus shows in side view a device according to the invention, wherein the pulp suspension is supplied to a cyclone 2 by means of a conduit 1. The inlet conduit 1 is arranged so that the pulp which is supplied flows into the cyclone 2 tangentially, in a horizontal plane along the inner periphery of the circular casing of the cyclone. The pulp suspension is supplied in the preferred case at a relatively high speed, such as greater than 10 m/s or approximately 15–20 m/second. Owing to the centrifugal force, the pulp suspension and gas will be separated, and the suspension then moves downwards towards a collecting device 3 that is situated below and that in the preferred case is in the form of a storage tower.

The gas, on the other hand, will be pressed into a pipe 4 located inside the cyclone 2 and move up through this pipe to a receiving device 6, 7 located above and containing a liquid bath.

Figure 1:
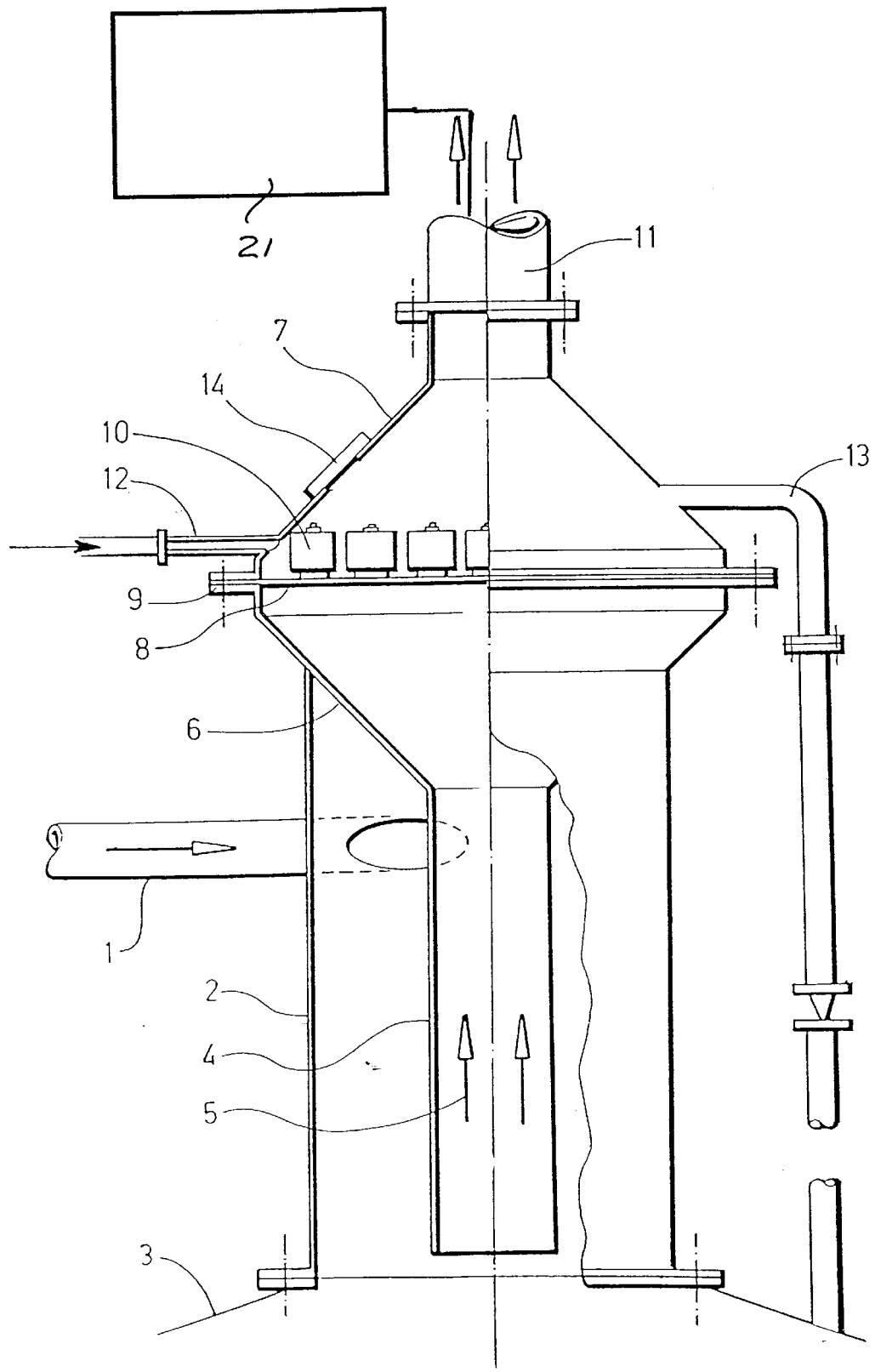
FIG. 1 shows a basic set-up according to the invention in its entirety.

The liquid-containing receptacle 6, 7 comprises in principle two truncated cones that are attached at their bases and joined to each other by means of allround-encircling ring-shaped flanges 9. Between the said flanges 9, a plate 8 is located. On this plate 8 are fixed a number of liquid seals 10, which, in accordance with the preferred case as shown, are distributed evenly on the plate. The purpose of the waterseals is to ensure the existence of a liquid bath, through which gas must pass, for the separation of residual fibres, etc., before the gas is drawn off upwards via a conduit 11, which guides it to the "ozone destroyer". The "ozone destroyer" is shown schematically at 21 in FIG. 1 and may take one of number of available forms. Preferably, the ozone destroyer uses a plasma torch to disassociate the ozone into oxygen and other harmless gases or carbon by-products which can be collected on a cooled surface provided in the ozone destroyer 21 and either cleaned or recovered for other uses. The oxygen gas can be recovered and used as a fuel or simply released. In another form , catalysts may be installed in the ozone destroyer to reduce the ozone to oxygen and compounds such as nitrous oxide or other oxides which can be readily disposed of.

In order to ensure a certain level in the said liquid bath, there is, in the preferred case, an inlet conduit 12 which continually supplies liquid to the liquid bath. The superfluous liquid is permitted to run out via the waterseal elements, mainly in order to prevent sedimentation. The figures further show that in the preferred case there is also a safeguarding overflow conduit 13 which prevents liquid, in the event of a fault, from rising up into the outlet conduit 11. A panel 14 can be moved to allow inspection of the receptacle.

Figure 3:
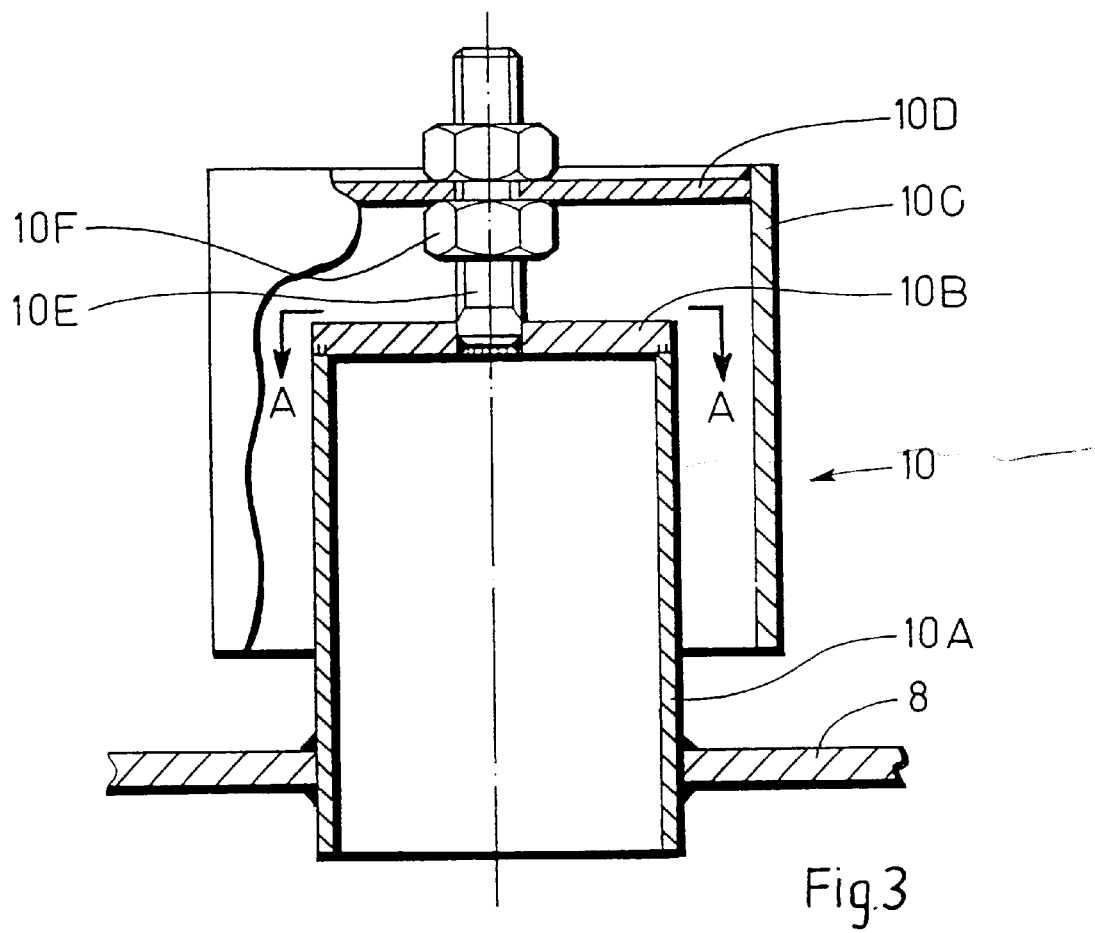
FIG. 3 shows the same waterseal element seen in the section A—A.
Figure 2:
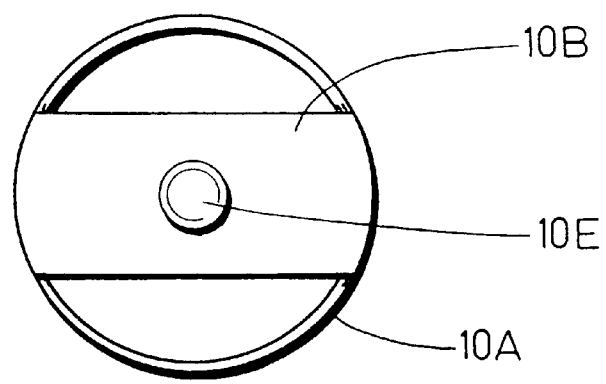
FIG. 2 shows a waterseal element according to the invention, seen in cross-section from the side.

In FIG. 2 a liquid seal according to the invention is shown in detail, seen from the side and partly in cross-section. The liquid seal 10 consists of a base part 10A, that is attached to plate 8 and that in this preferred case is welded firmly to plate 8. The base part 10A consists of a cylindrical pipe on top of which a diametrically-orientated flat bar 10B has been fixed (see FIG. 3). On top of the bar 10B is fixed a threaded bar 10E that is directed upwards and that with the aid of nuts 10F permits variable fixing of an outer allround-enclosing vessel/casing 10C, 10D that is necessary for the waterseal. The vessel consists of a second cylindrical pipe part 10C, whose diameter exceeds that of the first-named part 10A. A cylindrical bottom plate 10D is welded firmly on the top of the above-mentioned cylindrical second pipe part 10C, which bottom plate, together with the screw union, on fixing creates a tight vessel which is only open downwards.

The gas is consequently intended to move upwards through the first cylindrical part 10A, turn round over its upper edge and then down through the gap which is formed between the inner pipe 10A and the outer pipe 10C, in order to turn round the lower edge of the outer pipe 10C and subsequently move upwards again.

It is normal in connection with the use of such liquidseals that the level of the liquid should be immediately under or level with the upper edge of the inner pipe 10A, whereby the gas must therefore exert a pressure corresponding to the liquid column existing between the two pipes in order to pass through the liquid bath. If the height position of the inverted vessel 10C, D, is adjusted upwards, the pressure the gas must exert to be able to force up through the water bath is thus reduced.

Figure 4:
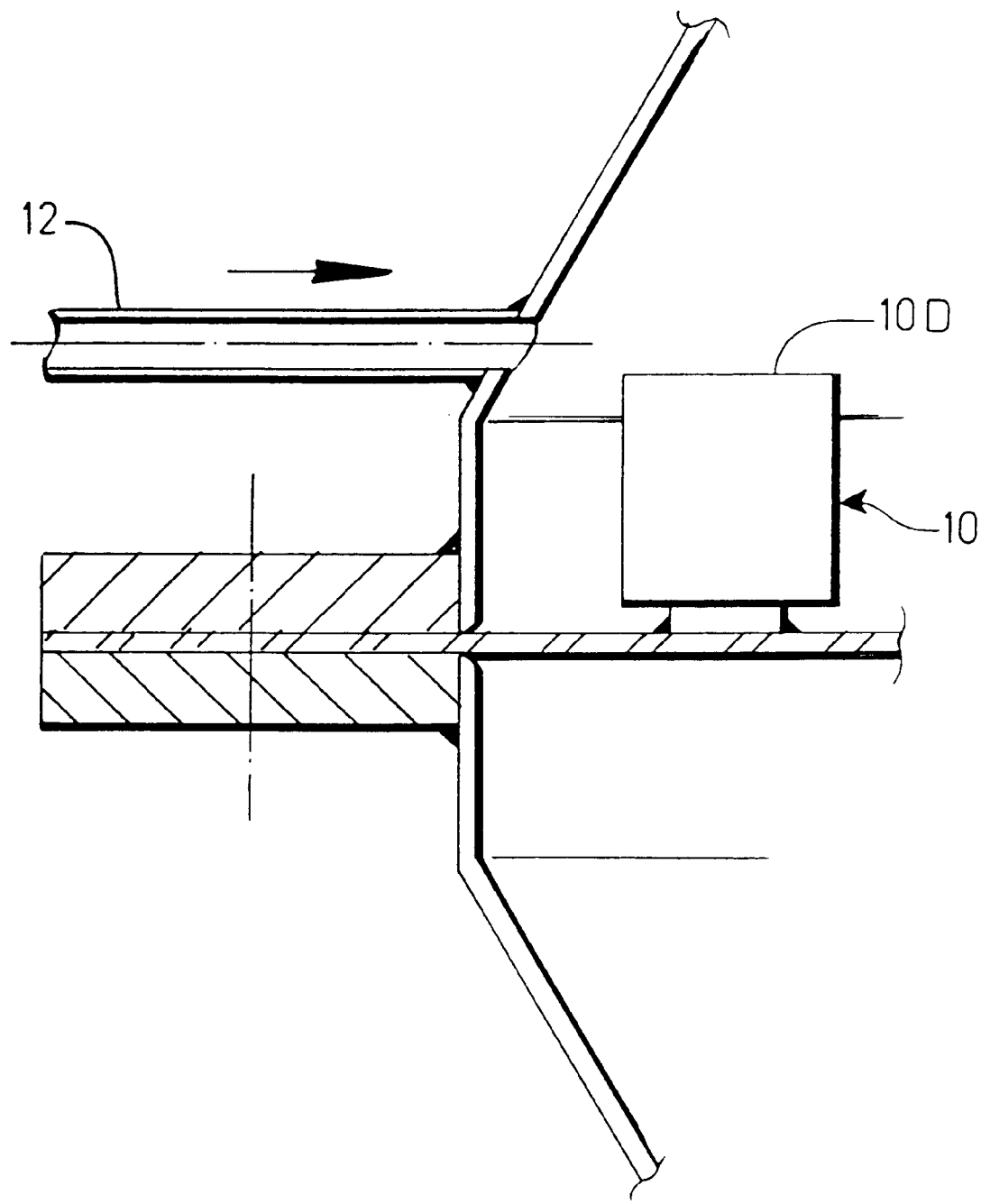
FIG. 4 shows parts of a section of a device according to the invention, and FIG. 5 Shows a preferred embodiment of a waterseal element according to the invention.

In FIG. 4 the presence is shown of an inlet pipe 12 for continuous supply of liquid to the liquid bath, in accordance with the preferred case. Here, liquid is supplied in such excess that outflow will take place through each waterseal 10, i.e. liquid will continuously be running over the edge of the inner pipe 10A and down through the underlying parts 4, 2. The reason for this is that it is thus possible on the one hand to counteract the risk of breakthrough, i.e. that such large bubbles are formed that a part of the gas can directly reach the outflow 11 without passing the liquid bath, and on the other hand to be able to have a sufficiently intensive bubble formation to counteract sedimentation of accumulated fibres. In order to counteract sedimentation of fibres bubbles must therefore be formed relatively near the bottom plate 8. At the same time the risk of breakthrough must be eliminated, which is achieved by maintaining a relatively high liquid level in the bath.

Figure 5:
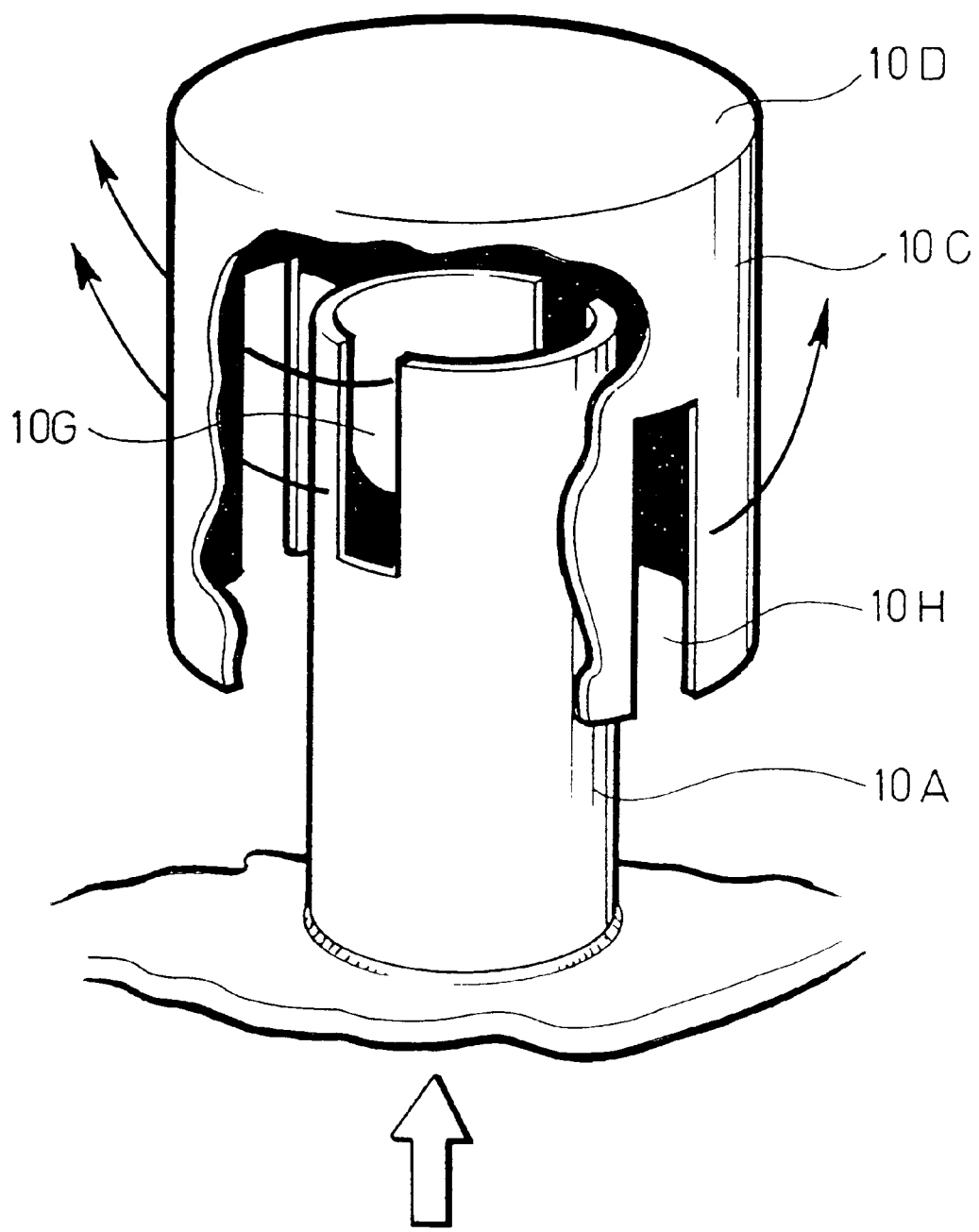

In connection with experiments that have been carried out, it has been found advantageous to make vertical slits 10G and 10H in the inner 10A and outer pipe 10C respectively (see FIG. 5). By installing these slits it is simpler to regulate/optimise the counterpressure that is required to be exerted against the gas. This counterpressure must in fact not be too high, as the risk is then run of impairing the effectiveness of the cyclone 2 because the latter requires high inlet speeds in order to function well. It has even been found advantageous to arrange the upper edge of the outer slit 10H above the lower edge of the inner slit 10G, so that in principle an undeviated path of communication for the gas through the waterseal element 10 is obtained at least partially in the horizontal plane, in contrast to what is customary for waterseals.

A waterseal device constructed and adjusted according to the preceding embodiment is found to be particularly suitable for creating optimal bubble formation, resulting in good ability to absorb the fibres from the gas stream and to counteract sedimentation, in addition to which a certain amount of fibres is simultaneously removed by means of the outflowing liquid stream. It should be noted that this liquid stream is very small in relation to the amount of suspension supplied into the cyclone 2, and in the preferred case this quantity represents less than 0.1% of the pulp suspension flow.

The invention is not limited by what has been indicated above but can be varied within the limits of the subsequent patent claims. Thus it is possible that a separation device of this type can also be used for other forms of separation than for fibres in connection with ozone treatment of a pulp suspension. The cyclone and the receptacle with the liquid bath could possibly be placed in another way than directly over each other, for example alongside each other, which is also possible with regard to the pulp storage tower 3 and cyclone 2. Other obvious changes are choice of side openings, i.e. instead of slits, holes can of course be used, or a number of narrower slits could be employed although the slit size should not fall below approximately 5 mm, since there is then the risk of blockage. It is evident that other shapes than the oppositely-orientated truncated cones can be used in conjunction with the liquid bath. It is, however, advantageous that a space for the liquid bath is created that has a larger cross-section than the inflow conduit 4 for the gas 5.

Instead of the thread-based adjustment mechanism shown for waterseals, some form of rapid adjustment can be envisaged, for example a bearing frame which supports all or a number of the outer vessels 10C, 10D, which bearing frame is for example movable with the aid of piston cylinders which in the preferred case are regulated automatically in relation to a pre-set set point for the pressure inside the cyclone 2. In the same way some form of automatic regulation can be envisaged of the inflow for the continuous supply to the liquid bath, which supply can of course also take place intermittently.

That which is claimed is:

1. Process for the separation and purification of a treatment gas from a fibre suspension, where the treatment gas includes ozone from ozone delignification of a pulp suspension comprising the steps of a) introducing the suspension and gas into a cyclone in which separation of the suspension from the gas takes place with the suspension being drawn off vertically downwardly and the gas containing residual fibres and other impurities being drawn off vertically upwardly, b) feeding the gas stream through a liquid bath including at least one seal device for removing residual fibres and other impurities while replenishing the liquid bath at least periodically; and c) then feeding the gas stream to an ozone destroyer.

2. Process according to claim 1 wherein drainage of liquid from the liquid bath takes place in such a way that the drained liquid moves in the opposite direction in relation to the gas that is being supplied to the liquid bath.

3. Process according to claim 1 wherein said liquid bath comprises at least one waterseal.

4. Process according to claim 1 wherein the inlet speed of the said fibre suspension into the cyclone is greater than 10 m/s.

5. Process according to claim 1 wherein said liquid bath is replenished and drained continuously.

6. Process as claimed in claim 1 wherein said liquid bath comprises several water seals.

7. Process as claimed in claim 1 wherein the inlet speed of said fibre suspension into the cyclone is between 15–20 m/s.

8. Process for the separation and purification of a treatment gas from a fibre suspension, where the treatment gas includes ozone from ozone delignification of a pulp suspension comprising the steps of a) introducing the suspension and gas into a cyclone in which separation of the suspension from the gas takes place with the suspension being drawn off vertically downwardly and the gas containing residual fibres and other impurities being drawn off vertically upwardly, b) feeding the gas stream through a liquid bath including at least one liquid seal device for removing residual fibres and other impurities while replenishing the liquid bath at least periodically and with the liquid seal device including a first pipe having an open end, a slit in said pipe extending from said open end and a second pipe having a slit therein with said second pipe being positioned over and spaced from said first pipe and having an open end defined by an edge having a slit therein with said slits of said first and second pipes extending generally vertically; and c) then drawing off the gas stream and feeding the gas stream to an ozone destroyer.

* * * * *